United States Patent
Putzer

(10) Patent No.: US 7,211,330 B2
(45) Date of Patent: May 1, 2007

(54) POLYORGANOSILOXANE COMPOSITION

(75) Inventor: Markus Alexander Putzer, Leverkusen (DE)

(73) Assignee: GE Bayer Silicones GmbH & Co. KG, Leverkusen (DE)

( * ) Notice: Subject to any disclaimer, the term of this patent is extended or adjusted under 35 U.S.C. 154(b) by 0 days.

(21) Appl. No.: 10/470,138

(22) PCT Filed: Jan. 24, 2002

(86) PCT No.: PCT/EP02/00718

§ 371 (c)(1),
(2), (4) Date: Dec. 8, 2003

(87) PCT Pub. No.: WO02/062897

PCT Pub. Date: Aug. 15, 2002

(65) Prior Publication Data

US 2004/0122197 A1    Jun. 24, 2004

(30) Foreign Application Priority Data

Jan. 26, 2001  (DE)  ............................ 101 03 421

(51) Int. Cl.
*B32B 25/20* (2006.01)

(52) U.S. Cl. .................. 428/447; 428/451; 524/417; 528/34

(58) Field of Classification Search ................ 428/447, 428/451; 524/417; 528/34
See application file for complete search history.

(56) References Cited

U.S. PATENT DOCUMENTS

| | | | |
|---|---|---|---|
| 3,161,614 A | 12/1964 | Brown et al. | 260/46.5 |
| 3,334,067 A | 8/1967 | Weyenberg et al. | 260/46.5 |
| 3,689,454 A | 9/1972 | Smith et al. | 260/46.5 |
| 4,100,129 A | 7/1978 | Beers | 260/37 |
| 4,146,523 A * | 3/1979 | Favie | 524/274 |
| 4,273,698 A | 6/1981 | Smith, Jr. et al. | 260/37 |
| 4,395,526 A | 7/1983 | White et al. | 528/18 |
| 4,483,973 A | 11/1984 | Lucas et al. | 528/21 |
| 4,506,058 A | 3/1985 | Ashby et al. | 524/730 |
| 4,514,529 A | 4/1985 | Beers et al. | 523/200 |
| 4,528,353 A | 7/1985 | Lucas et al. | 528/21 |
| 4,585,821 A | 4/1986 | Progneaux et al. | 524/425 |
| 4,623,693 A | 11/1986 | Inoue et al. | 524/700 |
| 4,672,003 A | 6/1987 | Letoffe | 428/447 |
| 4,680,364 A | 7/1987 | Lucas | 528/15 |
| 4,705,826 A | 11/1987 | Weber et al. | 524/860 |
| 4,748,166 A | 5/1988 | Gautier et al. | 524/13 |
| 4,891,393 A | 1/1990 | Hirai et al. | 523/212 |
| 4,962,152 A | 10/1990 | Leempoel | 524/788 |
| 5,175,057 A | 12/1992 | Wengrovius et al. | 428/447 |
| 5,232,982 A | 8/1993 | Lucas | 524/731 |
| 5,420,196 A | 5/1995 | Lucas | 524/730 |
| 5,728,794 A | 3/1998 | Friebe et al. | 528/23 |
| 5,962,559 A | 10/1999 | Lucas et al. | 524/204 |
| 6,403,711 B1 | 6/2002 | Yang et al. | 525/100 |

FOREIGN PATENT DOCUMENTS

| | | |
|---|---|---|
| CA | 2 214 289 | 8/1997 |
| DE | 35 23 206 | 1/1987 |
| DE | 44 38 039 | 5/1996 |
| DE | 195 07 416 | 9/1996 |
| DE | 195 33 915 | 3/1997 |
| DE | 195 33 963 | 4/1997 |
| DE | 698 06 056 T2 | 1/2003 |
| EP | 0 021 859 | 1/1981 |
| EP | 0 069 256 | 1/1983 |
| EP | 0 070 786 | 1/1983 |
| EP | 0 137 883 | 4/1985 |

* cited by examiner

*Primary Examiner*—Kuo-Liang Peng
(74) *Attorney, Agent, or Firm*—Norris McLaughlin & Marcus PA

(57) ABSTRACT

The invention relates to a polyorganosiloxane composition, to a method for mixing the components and to a method for vulcanizing said polyorganosiloxane composition. The invention also relates to the vulcanized composition thereby obtained, to composite materials containing a substrate and the above-mentioned vulcanized composition, and to the use of the inventive polyorganosiloxane composition.

11 Claims, No Drawings

POLYORGANOSILOXANE COMPOSITION

This invention relates to a polyorganosiloxane composition, a method of combining the components and a method of vulcanizing said polyorganosiloxane composition, the vulcanized composition obtainable thereby, composite materials containing a substrate and said vulcanized composition as well as the use of the polyorganosiloxane composition.

This invention relates in particular to neutral crosslinking single-component silicone rubber compositions which crosslink at room temperature and permit immediate adhesion to polymethyl methacrylate (PMMA) after vulcanization; this invention also relates to a method of producing same and use thereof. Neutral crosslinking means that no corrosive cleavage products or those having an intense odor are released during crosslinking.

Polyorganosiloxane compositions, referred to below as RTV-1K (room temperature vulcanizing single component) alkoxy systems are ready-to-use compositions that can be stored in the absence of moisture, and then react to form elastomers by splitting off alcohols only when they come in contact with atmospheric humidity. Products of this type having an increased shelf life have long been known and have become established on the market for use as joint sealants, for example (German Patent 195 07 416). As shown here, production of transparent polyorganosiloxane compositions is also possible here. These consist of silicone polymers terminated with organyloxy groups, optionally unreactive polysiloxane plasticizers, alkoxysilane crosslinking agents having at least three hydrolyzable groups, catalysts, fillers and optionally other additives. The advantage of these alkoxy systems is that in the course of the vulcanization process they release only odorless, neutral and environmentally safe alcohols as cleavage products. The present invention relates in particular to special transparent RTV-1K compositions which manifest adhesion to polymethyl methacrylate (PMMA), immediately after vulcanization.

Polymethyl methacrylate (PMMA), known commercially as Plexiglass® (from Rohm & Haas and Röhm) is a widely used material in construction, for use in glass and window constructions and in the sanitation area. In the automotive and aviation industries, it is used to produce break-resistant glazing and lighting covers. PMMA has additional applications in optics, where it is used to manufacture lenses and optical fibers. PMMA is also used as a coating material for working materials. For example, surfaces of window frames are treated with PMMA to achieve a wood simulating effect or aluminum strips may be treated with PMMA powder coatings to protect them from environmental influences or to provide them with color. Therefore the adhesion to PMMA, which is achieved immediately after the crosslinking process, constitutes an important property of the RTV-1K compositions in addition to their permanent elasticity.

Already known transparent RTV-1K silicone sealants based on neutral alkoxy systems have a good adhesion power, which is manifested immediately after vulcanization, on such substrates as glass, aluminum and polyvinyl chloride and (PVC), among others. Adhesion to other types of plastics such as PMMA, however, is far more difficult to achieve. For example, in U.S. Pat. No. 4,483,973 and U.S. Pat. No. 4,528,353, Lucas et al. disclose transparent, neutral crosslinking RTV-1K silicone compositions which yield excellent long term adhesion to glass, metals, ceramics and a number of plastics, e.g., ABS, Noryl®, polystyrene and nylon when used with the help of aminosilanes as the adhesion promoter, but there is no adhesion to PMMA.

U.S. Pat. No. 5,175,057 describes single-component alkoxy compositions which are based on a dialkyltin bis-diketonate as catalyst, and on "M, D, T" silanol as well as alkoxysilanes functionalized with amino, ether, epoxy, isocyanate, cyano, acryloxy and acyloxy radicals as the adhesion promoter. None of the compositions proposed in U.S. Pat. No. 5,175,057 is capable of adhering to PMMA immediately after vulcanization. Other versions of these silicone rubber compositions are disclosed by Lucas in U.S. Pat. No. 5,232,982. They have a broader spectrum of adhesion to plastics, specifically polycarbonate, but they fail on PMMA.

The self-bonding RTV-1K compositions described in U.S. Pat. No. 4,680,364 are based on the effect of titanium chelates as the adhesive additive. The RTV-1K compositions described here have a broader adhesive spectrum, but adhesion to PMMA is not described. In addition, the poor solubility of titanium chelates in polydimethylsiloxane (PDMS) and the haze or cloudiness of siloxane compositions associated with this as well as the reddish inherent color of the chelates mentioned in U.S. Pat. No. 4,680,364 all have a negative effect on the transparency of the RTV-1K compositions.

Additional RTV-1K compositions with a self-bonding effect without using primers are described in U.S. Pat. No. 4,506,058, U.S. Pat. No. 4,100,129, U.S. Pat. No. 4,514,529, U.S. Pat. No. 4,273,698, U.S. Pat. No. 4,962,152, U.S. Pat. No. 4,623,693, U.S. Pat. No. 4,672,003, U.S. Pat. No. 4,891,393, U.S. Pat. No. 4,585,821 and U.S. Pat. No. 5,962,559. However, none of these patents contains any mention of the adhesion of the RTV-1K compositions to PMMA after vulcanization.

In U.S. Pat. No. 5,420,196, Luca discloses for the first time a transparent RTV sealant which is not based on titanium compounds and will adhere to PMMA automatically after vulcanization. The disadvantage of the RTV-1K sealant mentioned in U.S. Pat. No. 5,420,196, however, is the presence of hexamethyldisilazane, which acts as a stabilizer, and when it hydrolyzes on coming in contact with atmospheric humidity, it causes a pungent odor of ammonia, which drastically limits the applicability of this system. In addition, the use of a combination of three different adhesive additives with up to 1.1% of the respective components, as described in U.S. Pat. No. 5,420,196 has a negative effect with respect to the cost of materials.

In German Patent 195 33 915, Friebe et al. proposed neutral RTV-1K compositions based on organometaltin compounds and phosphoric acid esters. The use of tin phosphate technology is also described by Friebe in German Patent 197 57 308. However, despite the object of making available siloxane compositions capable of adhesion (this object has already been achieved in general), none of these patents is based on the specific object of improving the adhesion of RTV-1K sealants to substances, in particular plastics or especially to PMMA.

The object of this invention is to provide polyorganosiloxane compositions which will adhere to plastic substrates, in particular to PMMA surfaces, immediately after the vulcanization process and without the use of primers and which do not have the disadvantages of the RTV-1K compositions known in the related art such as inadequate odor properties and/or in the case of tin-free catalyst systems, inadequate transparency or lack of stability in storage. Stability in storage or being shelf-stable refers to the property of RTV-1K compositions of being storable for a defined period of time in the absence of moisture and then being crosslinkable after exposure to ambient air. The compositions made available by the present invention should therefore be transparent, odorless polyorganosiloxane compositions, which are neutral, room temperature vulcanizing compositions, in particular in the case of catalyst systems containing tin.

The object described above is surprisingly achieved by providing a polyorganosiloxane composition containing:
a) at least one crosslinkable polyorganosiloxane;
b) at least one alkoxysilane/siloxane representative;
c) at least one phosphoric acid ester and/or a salt thereof;
d) at least one catalyst containing tin or at least a catalyst containing a titanium chelate;
e) at least one aminoalkylsiloxane;
f) 0.05 wt % to 2 wt %, based on 100 wt % of the composition, of at least one compound selected from the group consisting of an isocyanurate of the formula:

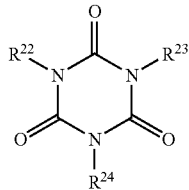

where $R^{22}$, $R^{23}$ and $R^{24}$ may be the same or different and are selected independently of one another from the group consisting of trialkoxysilylalkyl and alkenyl, with the provision that at least one of the substituents $R^{22}$, $R^{23}$ and $R^{24}$ is a trisiloxysilylalkyl group; a cyanurate of the formula:

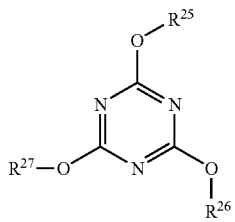

where $R^{25}$, $R^{26}$ and $R^{27}$ may be the same or different and each is selected independently of the others from the group consisting of trialkoxysilylalkyl, and alkenyl with the provision that at least one of the $R^{25}$, $R^{26}$ and $R^{27}$ substituents is a trialkoxysilylalkyl group, as well as condensation products having Si—O—Si bonds of the cyanurates and isocyanurates listed above and mixtures thereof.

It was surprising that the use of 0.05 to 2 wt % of the component f) described above, based on the total composition of the silicone rubber composition, when used as the adhesion promoter in polyorganosiloxane compositions containing phosphoric acid esters and organometallic catalyst systems will lead to silicone rubber compositions which exhibit adhesion to PMMA immediately after the curing process and without the use of primers and increase the stability in storage. In contrast with the related art, the use of an adhesion promoter combination of three individual components may be omitted here. Use of hexamethyldisilazane is not necessary either. In the case of the catalyst systems containing tin, the transparent and odorless RTV-1K silicone rubber compositions are characterized by a broad and reliable spectrum of adhesion to plastics such as polyvinyl chloride, polycarbonate and in particular various varieties of PMMA.

In the case of the crosslinkable polyorganosiloxanes (component a) of this composition used according to the present invention, they are preferably those of the general formula:

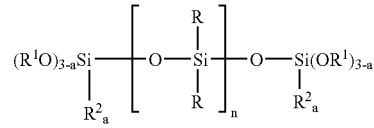

where the substituents R and $R^2$ denote, independently of one another, optionally substituted $C_1$–$C_8$ alkyl, $C_6$–$C_{14}$ aryl or $C_2$–$C_8$ alkenyl groups, and the $R^1$ substituents, independently of one another, denote hydrogen, optionally substituted $C_1$–$C_8$-alkyl, optionally substituted $C_1$–$C_8$-alkoxy ($C_1$–$C_8$)-alkyl, poly(alkyleneoxy)alkyl or $C_2$–$C_8$-alkenyl. The R, $R^1$ and $R^2$ substituents may be the same or different. The $R^1$ substituents may also be the same or different in one molecule or in different molecules. This is also true of the R and $R^2$ substituents; n is an integer calculated from the weight average and may preferably assume values of 50 to 2500, or even more preferably 500 to 2000, while a=0, 1 or 2.

The optionally substituted $C_1$–$C_8$ alkyl groups mentioned above include linear and branched alkyl groups with 1 to 8 carbon atoms, e.g., methyl, ethyl, n-propyl, isopropyl, n-butyl, isobutyl, pentyl, hexyl, heptyl, octyl, etc. Methyl is preferred.

Substituents of the optionally substituted $C_1$–$C_8$ alkyl groups mentioned above include in particular fluorine, and examples of the substituted alkyl groups include, e.g., trifluoropropyl groups, $C_6F_{13}$-ethylene, $C_3F_5$—O-propylene or fluoroxirane propyloxy-propylene.

The optionally substituted $C_6$–$C_{14}$ aryl groups mentioned above include aromatic groups having 6 to 14 carbon atoms such as phenyl or naphthyl, etc. Phenyl is preferred.

The optionally substituted $C_2$–$C_8$ alkenyl groups mentioned above include linear and branched alkenyl groups with 2 to 8 carbon atoms, e.g., vinyl, allyl, etc. Vinyl is preferred.

R is preferably a methyl group. $R^2$ is preferably methyl. $R^1$ is preferably methyl, vinyl or hydrogen.

Preferred alkyleneoxy groups in poly(alkyleneoxy)alkyl include ethyleneoxy and propyleneoxy.

Such crosslinkable polyorganosiloxanes are also known in the related art and are described, for example, in the patent mentioned above.

The crosslinkable polyorganosiloxanes used according to this invention preferably have a viscosity of 0.1 to 1000 Pa·s at 25° C., or even more preferably from 10 to 200 Pa·s.

One or more types of polyorganosiloxanes may be used in the composition according to this invention.

The crosslinkable polyorganosiloxanes used according to this invention may be polyorganoalkoxysiloxanes (a=0 or 1) or α,ω-hydroxyl-terminated polyorganosiloxanes (a=2). The polyorganoalkoxysiloxanes mentioned above are synthesized by reacting α,ω-hydroxyl-terminated polyorganosiloxanes (a=2) with at least two equivalents of an alkoxy crosslinking agent per molecule. The alkoxy crosslinking agent may be one of the alkoxy crosslinking agents contained in the composition according to this invention as described below. In synthesizing these polyorganoalkoxysiloxanes, it is preferable to use an excess of the alkoxy crosslinking agent, which is then contained in the composition according to this invention, where it functions as a crosslinking agent in curing. Examples of the reaction of α,ω-hydroxyl-terminated polyorganosiloxanes with alkoxysilane/siloxane crosslinking agents, the so-called end capping in which various catalysts may be used are described in European Patent 21 859, European Patent 69 256 (amines as catalysts), U.S. Pat. No. 3,161,614 (amines in mixture with metal carboxylates as catalysts), European Patent 137 883 (amines in mixture with Lewis acids as catalysts), German Patent 3 523 206 (ammonium carbamates as catalysts) and European Patent 70 786 (hydroxylamine derivatives as catalysts) as well as German Patent 195 33 915 (phosphoric acid esters).

The amount of crosslinkable polyorganosiloxanes used according to this invention in the composition according to this invention preferably amounts to at least approximately 30 wt %, more preferably at least approximately 40 wt %. The maximum amount is approx. 99.3 wt %, preferably approx. 85 wt %, thus yielding the following preferred ranges: from 30 wt % to 99.3 wt %, more preferably from 40 wt % to 85 wt %, each based on the total amount of the composition according to this invention.

In the case of the alkoxysilane/siloxane crosslinking agents used according to this invention, it is preferably an organosilicon compound of the formula

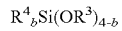

where the $R^4$ substituents, independently of one another, denote optionally substituted $C_1$–$C_8$ alkyl, $C_6$–$C_{14}$ aryl or $C_2$–$C_8$ alkenyl groups, $R^3$ is an optionally substituted $C_1$–$C_8$ alkyl or $C_2$–$C_8$ alkylenyl group and b as an integer of 0, 1 or 2 as well as condensates thereof. $R^3$ and $R^4$ may be the same or different. With respect to the meaning of the optionally substituted $C_1$–$C_8$ alkyl, $C_1$–$C_8$ alkoxyalkyl, $C_6$–$C_{14}$ aryl or $C_2$–$C_8$ alkenyl groups, reference can be made to the statements made above regarding the polyorganosiloxanes. In addition, optionally substituted $C_1$–$C_8$ alkyl also includes $C_1$–$C_8$ alkoxy($C_1$–$C_8$)alkyl.

The alkoxysilane/siloxane crosslinking agent is preferably at least one component selected from the group consisting of tetraethoxysilane, polysilicic acid esters, vinyltrialkoxysilanes, methoxyethyltrialkoxysilanes and methyltrialkoxysilanes. Even more preferably, the alkoxy crosslinking agents are selected from methyltrimethoxysilane, methyltriethoxysilane, vinyltrimethoxysilane and/or vinyltriethoxysilane.

One or more alkoxy crosslinking agents may be used in the composition according to this invention.

The amount of alkoxysilane/siloxane crosslinking agent used according to this invention in the inventive composition preferably amounts to at least approx. 0.3 wt %, even more preferably at least approx. 0.4 wt %. The maximum amount is approx. 10 wt %, preferably approx. 6 wt %, thus yielding the following preferred ranges: from 0.3 wt % to 10 wt %, more preferably from 0.4 wt % to 6 wt %, each based on the total amount of the composition according to this invention.

The aminoalkylsiloxanes used in the polyorganosiloxane compositions according to this invention and/or RTV-1K compositions preferably correspond to the general formula

where X is selected from —$NH_2$ and/or —$NHCH_2CH_3NH_2$ and the $R^5$ substituents, each independently of the others, denote optionally substituted $C_1$–$C_8$ alkyl, $C_6$–$C_{14}$ aryl, $C_2$–$C_8$ alkenyl or siloxane groups. With regard to the meaning of the $C_1$–$C_8$ alkyl groups, $C_6$–$C_{14}$ aryl groups, $C_2$–$C_8$ alkenyl groups, reference can be made to the preceding discussion regarding the substituents R, $R^1$ and $R^2$.

Aminoalkylsiloxanes in the formula given above in which $R^5$ denotes a siloxane group are obtained for example by condensation of these compounds with themselves with the cleavage of alcohol and/or by condensation of the aforementioned compounds with SiOH-functionalized linear or branched polysiloxanes.

In addition, mixtures of aminoalkylsiloxanes may also be used.

Aminopropyltrialkoxysilanes and α,ω-bis(diethoxy-3-propylamine)-terminated polydimethylsiloxanes are especially preferred, and aminopropyltrimethoxysilane, aminopropyltriethoxysilane and α,ω-bis(diethoxy-3-propylamine)-terminated dodecamethylhexasiloxane are especially preferably used.

The amount of the aminoalkylsiloxanes used according to this invention in the inventive composition preferably amounts to at least approx. 0.1 wt %, even more preferably at least approx. 0.2 wt %. The maximum amount is approx. 30 wt %, preferably approx. 20 wt %, thus yielding the following preferred ranges: from 0.1 wt % to 30 wt %, preferably from 0.2 wt % to 20 wt %, each based on the total amount of the inventive composition.

The phosphoric acid esters used according to this invention and their salts are preferably selected from mono-, di- or triorthophosphoric acid esters as well as polyphosphoric acid esters and the salts thereof.

The mono-, di- or triorthophosphoric acid esters are preferably those of the formula:

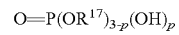

where p=0, 1 or 2, $R^{17}$ is selected from the group consisting of linear or branched and optionally substituted $C_1$–$C_{30}$ alkyl groups, linear or branched $C_5$–$C_{14}$ cycloalkyl groups, $C_6$–$C_{14}$ aryl groups, $C_6$–$C_{31}$ alkylaryl groups, linear or branched $C_2$–$C_{30}$ alkenyl groups or linear or branched $C_1$–$C_{30}$ alkoxy ($C_1$–$C_{30}$)alkyl groups, polyalkenyloxy groups (polyethers), triorganyl-silyl and diorganyl($C_1$–$C_{30}$)alkoxysilyl groups.

It is especially preferable for p=1 or 2.

With respect to the $C_1$–$C_{30}$ alkyl groups, $C_6$–$C_{14}$ aryl groups, $C_5$–$C_{14}$ cycloalkyl groups, $C_6$–$C_{31}$alkylaryl groups and/or $C_2$–$C_{30}$ alkenyl groups, $C_1$–$C_{30}$ alkoxy($C_1$–$C_{30}$)alkyl groups, polyalkenyloxy groups (polyethers) and triorganyl-silyl groups and diorganyl($C_1$–$C_{30}$)alkoxysilyl groups, reference is made to the following discussion with respect to the catalyst containing tin.

If p=1 or 2, the phosphoric acid esters may react with bases to form salts. Use of these salts is possible according to this invention. Phosphoric acid esters and/or acid phosphate ester salts are preferred. Acid phosphate ester salts also include nonstoichiometric reaction products of phosphoric acid esters with bases. Bases which may be used in the reaction of the acid phosphate esters include, for example, hydroxides, oxides, carbonates of alkali metals and alkaline earth metals as well as ammonia and mono-, di- or trialkylamine and tetraalkylammonium hydroxides and arylalkylammonium hydroxides. In particular, the aminoalkylsiloxanes used according to this invention may also enter into a reaction with the acidic phosphoric acid esters when the components are combined.

Monophosphoric acid esters are preferred, including monobutyl, monoisodecyl, mono-(2-ethylhexyl), monoisononyl, monohexyl, monotridecyl and monooctadecyl esters, mono- and/or diester mixtures of short-chain alkylene end-capped polyethers such as Marlophor N5®, phenyl esters or bis(trimethylsilyl)phosphoric acid and the acid salts thereof are especially preferred.

The amount of the phosphoric acid esters used according to this invention in the inventive polyorganosiloxane composition preferably amounts to at least approx. 0.05 wt %, even more preferably at least approx. 1.0 wt %. The maximum amount is approx. 10.0 wt %, preferably approx. 6 wt %, which can thus yield the following preferred ranges: from 0.05 wt % to 10.0 wt %, preferably from 1.0 wt % to 6 wt %, each based on the total amount of the composition according to this invention.

The amount of the phosphoric acid ester in the polyorganosiloxane composition according to this invention preferably amounts to 0.5 to 5 mol per mol of the catalyst containing tin or the titanium chelate catalyst.

Component d) of the composition according to this invention may be at least one catalyst containing tin or at least one titanium chelate catalyst.

The catalyst containing tin is preferably an organotin compound. It is especially preferably at least one organic tin compound of the formula $$R^6{}_{4-m}SnY_m$$

where m=1, 2 or 3, $R^6$ is selected from the group consisting of linear or branched optionally substituted $C_1$–$C_{30}$ alkyl groups, $C_5$–$C_{14}$ cycloalkyl groups or $C_6$–$C_{14}$ aryl groups, triorganylsilyl groups and diorganyl($C_1$–$C_{30}$)alkoxysilyl groups, and if there is a plurality of substituents $R^6$, they may be the same or different and Y is selected from the group consisting of halogen, $OR^7$, $OC(O)R^8$, OH, $SR^9$, $NR^{10}{}_2$, $NHR^{11}$, $OSIR^{12}{}_3$, $OSi(OR^{13})_3$, where the substituents $R^7$ through $R^{13}$ independently of one another are each selected from optionally substituted $C_1$–$C_8$ alkyl groups, $C_6$–$C_{14}$ aryl and/or $C_2$–$C_8$ alkenyl groups, and/or compounds from the general formulas $R^{14}{}_2SnY'$, $R^{15}{}_3SnY'{}_{1/3}$ and/or $R^{16}SnY'{}_{3/2}$, where $R^{14}$, $R^{15}$ and $R^{16}$ are each selected independently of the others from the group consisting of linear or branched $C_1$–$C_{30}$ alkyl groups, $C_5$–$C_{14}$ cycloalkyl groups or $C_6$–$C_{14}$ aryl groups, and when a plurality of these substituents is present on the molecule they may be the same or different, and Y'=O or S.

The linear or branched optionally substituted $C_1$–$C_{30}$ alkyl groups mentioned in the definition of the above mentioned organic tin compounds include those with 1 to 30 carbon atoms, such as methyl, ethyl, chloroethyl, n-propyl, isopropyl, n-butyl, isobutyl, pentyl, hexyl, heptyl, ethylhexyl, octyl, decyl, undecyl, dodecyl, tridecyl, etc. Butyl, hexyl or octyl is preferred.

The $C_5$–$C_{14}$ cycloalkyl groups mentioned in the definition of the organic tin compounds mentioned above include monocyclic or polycyclic alkyl groups such as cyclopentyl, cyclohexyl, cyclohexylethyl, cyclooctyl, decalinyl, hydrindanyl, bicyclo[2.2.1]heptanyl, bicyclo[2.2.2]octanyl, bicyclo[4.2.3]nonyl, etc.

$C_6$–$C_{14}$ aryl groups include, for example, phenyl groups and naphthenyl groups, fluorinyl groups. Examples of $C_6$–$C_{31}$ alkylaryl groups include tolyl, xylyl, 2,4-di-tert-butylphenyl groups. $C_2$–$C_{30}$ alkenyl groups include vinyl, allyl, octenyl, cyclohexenylethyl, norbornenyl. Examples of $C_1$–$C_{30}$-alkoxy($C_1$–$C_{30}$)alky groups include methoxy- and nonyloxy-substituted ethyl, butyl or hexyl groups. Polyalkenyloxy groups (polyethers) include as representatives ethyl, nonyl or stearyl mono-end-capped polyethyleneoxy groups with a degree of polymerization of 3–20.

With respect to the $C_1$–$C_8$ alkyl, $C_6$–$C_{14}$ aryl and/or $C_2$–$C_8$ alkenyl groups mentioned in the definition of the organic tin compounds mentioned above, reference is made to the discussion of these substituent groups in the case of the crosslinkable polyorganosiloxanes. Preferred tin compounds include dioctyltin oxide, dibutyltin oxide, dimethyltin oxide, dimethyltin dichloride, dibutyltin dichloride, tributyltin chloride, dibutyltin dilaurate, dibutyltin diacetate, dibutyltin maleate, dibutyltin dihexanoate, dibutyltin dioctoate, dioctyltin dioctoate, dioctyltin dilaurate, dioctyldibutoxystannan and/or tributylethoxystannan.

Furthermore, reaction products of the organotin compounds described above with one or more silicic acid ester, polysilicic acid esters, organylalkoxysilane and/or their partial hydrolysates may also be used as the catalysts containing tin.

The amount of catalysts containing tin in the inventive polyorganosiloxane composition is preferably at least approx. 0.2 wt %, even more preferably at least approx. 0.3 wt %. The maximum amount is approx. 5 wt %, preferably approx. 4 wt %, thus yielding the following preferred ranges: from 0.2 wt % to 5 wt %, more preferably from 0.3 wt % to 4 wt %, each based on the total amount of the composition according to this invention.

The titanium chelate catalysts that can be used according to this invention are known per se and are described, for example, in U.S. Pat. No. 4,680,364, U.S. Pat. No. 3,689,454, U.S. Pat. No. 3,334,067, German Patent 19 507 416 and U.S. Pat. No. 4,438,039.

The amount of catalyst containing tin or titanium chelate catalysts in the inventive polyorganosiloxane composition is preferably at least approx. 0.2 wt %, even more preferably at least approx. 0.3 wt %. The maximum amount is approx. 5 wt %, preferably approx. 4 wt %, thus yielding the following preferred ranges: from 0.2 wt % to 5 wt %, more preferably from 0.3 wt % to 4 wt %, each based on the total amount of the inventive composition.

Catalysts containing tin are preferably used as component d) of the inventive composition.

The inventive polyorganosiloxane composition contains as component f) 0.05 to 2 wt %, based on 100 wt % of the composition, of at least one compound selected from the group consisting of an isocyanurate of the formula:

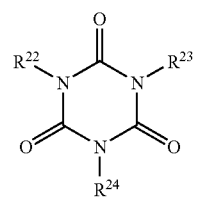

where $R^{22}$, $R^{23}$ and $R^{24}$ may be the same or different and each is selected, independently of the others, from the group consisting of trialkoxysilylalkyl and alkenyl with the provision that at least one of the substituents $R^{22}$, $R^{23}$ and $R^{24}$ is a trialkoxysilylalkyl group;

a cyanurate of the formula

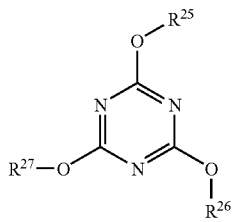

where $R^{25}$, $R^{26}$ and $R^{27}$ may be the same or different and each is selected independently of the others from the group consisting of trialkoxysilylalkyl, and alkenyl with the provision that at least one of the substituents $R^{25}$, $R^{26}$ and $R^{27}$ is a trialkoxysilylalkyl group;

and condensation products with Si—O—Si bonds of the cyanurates and isocyanurates listed above as well as mixtures thereof.

The substituent groups $R^{22}$ through $R^{27}$ are selected from trialkoxysilylalkyl and/or alkenyl. At least one of the substituent groups $R^{22}$ through $R^{24}$ or $R^{25}$ through $R^{27}$ contained in the formulas given above is a trialkoxysilylalkyl group; even more preferably all of the substituent groups $R^{22}$ through $R^{24}$ and/or $R^{25}$ through $R^{27}$ are trialkoxysilylalkyl groups. Trialkoxysilylalkyl preferably includes groups of the formula $(CH_2)_zSi(OR^{25})_3$ where the substituent $R^{25}$ may be the same or different, each denoting, independently of the others, a $C_1$–$C_4$ alkyl group, and z is an integer from 3 to 8, preferably 3.

$C_1$–$C_4$ alkyl groups include linear or branched alkyl groups with 1 to 4 carbon atoms such as methyl, ethyl, propyl, isopropyl, n-butyl, sec-butyl, isobutyl and tert-butyl. Methyl and ethyl are preferred.

Condensation products with Si—O—Si bonds of the cyanurates and isocyanurates mentioned above and mixtures thereof are obtained by condensation of the cyanurates and isocyanurates and mixtures thereof at the trialkoxysilyl functions under the influence of water and splitting off alcohols to form the Si—O—Si bonds.

Preferred tris-[3-(trialkoxysilyl)alkyl] isocyanurates include tris[3-trimethoxy- or ethoxysilyl)propyl] isocyanurates and condensates thereof. Preferred tris[3-(trialkoxysilyl)alkyl] cyanurates include tris[3-(trimethoxy- or ethoxysilyl)propyl] cyanurates and condensates thereof.

The concentration of component f) preferably amounts to at least approx. 0.05 wt %, more preferably at least approx. 0.2 wt %. The maximum concentration is approx. 1.6 wt %, more preferably max. approx. 1 wt %, each based on 100 wt % of the composition. This yields as preferred ranges in particular 0.05 to 1.6 wt %, especially preferably 0.2 to 1 wt %, each based on 100 wt % of the composition.

In addition to components a) through f) additional components may be added to the polyorganosiloxane composition according to this invention. These include in particular:

g) optionally a filler;

h) optionally an additive, e.g., non-crosslinkable siloxanes, adhesion promoters, fungicides, solvents, organic dyes, pigments, etc.

Fillers include for example amorphous or crystalline, reinforcing or non-reinforcing silicic acid, silicates, oxides and carbonates. Examples of transparent polyorganosiloxane compositions include in particular pyrogenic, hydrophobic or hydrophilic silicic acids with a BET surface of 90 to 400 m²/g.

The polyorganosiloxane composition according to this invention preferably contains:

a) 30 to 99.3 wt % of at least one crosslinkable polyorganosiloxane;

b) 0.3 to 10 wt % of at least one alkoxysilane/siloxane crosslinking agent;

c) 0.05 to 10 wt % of at least one phosphoric acid ester;

d) 0.02 to 5 wt % at least one catalyst containing tin or at least one catalyst containing a titanium chelate;

e) 0.1 to 30 wt % at least one aminoalkylsiloxane;

f) 0.05 to 2 wt %, based on 100 wt % of the composition, of at least one compound selected from the group consisting of an isocyanurate of the formula:

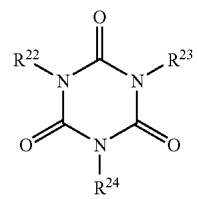

where $R^{22}$, $R^{23}$ and $R^{24}$ may be the same or different and each is selected, independently of the others, from the group consisting of trisalkoxysilylalkyl and alkenyl, with the provision that at least one of the substituents $R^{22}$, $R^{23}$ and $R^{24}$ is a trisalkoxysilylalkyl group, a cyanurate of the formula:

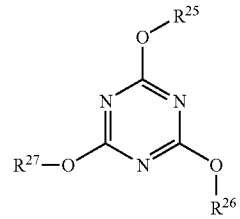

where $R^{25}$, $R^{26}$ and $R^{27}$ may be the same or different and each is selected independently of the others from the group consisting of trisalkoxysilylalkyl and alkenyl, with the provision that at least one of the substituents $R^{25}$, $R^{26}$ and $R^{27}$ is a trisalkoxysilylalkyl group, as well as condensation products with Si—O—Si bonds of the cyanurates and isocyanurates mentioned above as well as mixtures thereof, g) 0 to 60 wt % of a filler;

h) 0 to 50 wt % of an additive selected from non-crosslinkable siloxanes, adhesion promoters, fungicides, solvents and/or pigments.

Combining the components a) through g) listed above of the composition of this invention may expediently be performed by combining first the components a), b) and c) and then adding the other components to the mixture of a), b) and c). In a second embodiment, a) may be combined with e) or e)+c) before adding b), followed by g), h) and then d) and f). Preferably the next component added to the mixture of a), b) and c) will be components g) and h) and then finally components e) and d) and in conclusion f) are added to the resulting mixture.

If component a) is a polyorganoalkoxysiloxane, then c) and d) may also be added to the mixture of a) and b) in the form of a previously synthesized reaction product after combining components a) and b).

The advance reaction of the phosphoric acid ester component c) and component d), in particular the catalyst containing tin, is described, for example, in German Patent 19533963-C1, to which reference is made here for further details.

Together with the addition of component b), it is expedient to add a small amount of an aliphatic alcohol, preferably a $C_1$–$C_4$ alkanol, to limit the increase in viscosity due to the reaction of components a), b) and c).

The polyorganosiloxane compositions or RTV-1K compositions can be synthesized step by step in a batch process or continuously with the help of extruders. Depending on the application, the inventive compositions may be solid or free flowing.

This invention also relates to the composition obtainable by vulcanizing the polyorganosiloxane composition of this invention. In conjunction with this invention, vulcanizing means the hardening with crosslinking and simultaneous release of alcohols in the presence of moisture or water.

The method of vulcanizing the polyorganosiloxane composition according to this invention is characterized in general by the fact that the polyorganosiloxane composition of this invention is brought in contact with water at a temperature of 0 to 120° C. Water here means any type of water, in particular exposure to atmospheric humidity when processing the polyorganosiloxane composition in a known manner.

Vulcanizing of the polyorganosiloxane composition of this invention is usually performed in contact with a substrate. Therefore, this invention also relates to the composite material obtained by vulcanizing the polyorganosiloxane composition on a substrate.

Suitable substrates include for example those of metal, metal oxides, glass, plastics, powder coatings or resins and ceramics. Plastics include, for example PVC, polystyrene, polyamides, acrylbutadienes, polyesters, polycarbonates, urethanes and acrylates. The polyorganosiloxane composition of this invention is especially preferably applied to polyacrylates, in particular polymethyl methacrylate.

The polyorganosiloxane composition of this invention is preferably used as a joint sealant, adhesive, coating composition or molding.

This invention also relates to the use of a polyorganosiloxane composition containing 0.05 wt % to 2 wt % of at least one compound selected from the group consisting of an isocyanurate of the formula

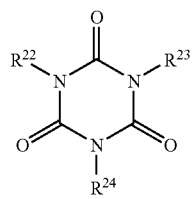

where $R^{22}$, $R^{23}$ and $R^{24}$ may be the same or different and each is selected independently of the others from the group consisting of trisalkoxysilylalkyl and alkenyl, with the provision that at least one of the substituents $R^{22}$, $R^{23}$ and $R^{24}$ is a trisalkoxysilylalkyl group, a cyanurate of the formula

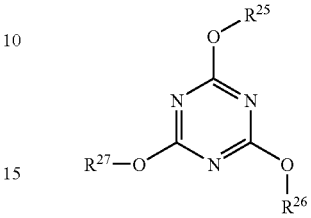

where $R^{25}$, $R^{26}$ and $R^{27}$ may be the same or different and each is selected independently of the others from the group consisting of trisalkoxysilylalkyl and alkenyl, with the provision that at least one of the substituents $R^{25}$, $R^{26}$ and $R^{27}$ is a trisalkoxysilylalkyl group, as well as condensation products with Si—O—Si bonds of the cyanurates and isocyanurates listed above as well as mixtures thereof, based on the total amount of the polyorganosiloxane composition, for use on polymethyl methacrylate substrates.

EXAMPLES

The following examples are presented to illustrate this invention without having a restrictive effect. Synthesis of the transparent polyorganosiloxane compositions that vulcanize neutrally at room temperature was performed in the order listed below in a 1 liter planetary mixer (e.g., from Drais), according to the examples given below. The individual components were mixed at intervals of 5 minutes at temperatures between 25 and 50° C. under dry nitrogen. After conclusion of the synthesis, the mixture was freed of enclosed gas bubbles by continuing to stir under a slight vacuum. Then the siloxane compositions were placed in plastic cartridges made of HDPE with an average wall thickness of 1.2 mm that could be sealed airtight and optionally stored as indicated to make them available for the comparative investigations.

Example 1

A silicone rubber composition was prepared according to the following formulation.

Formulation A:
1) 56.2 parts by weight of an α,ω-hydroxyl-terminated polydimethylsiloxane characterized by a viscosity of 80 Pa·s at a shear rate of D=1·s$^{-1}$ at 25° C.
2) 28.4 parts by weight of an α,ω-trimethyl-terminated polydimethylsiloxane characterized by a viscosity of 100 mPa·s at 25° C. at a shear gradient of D=1·s$^{-1}$
3) 2.9 parts by weight methyltrimethoxysilane (MTMS)
4) 0.2 parts by weight methanol
5) 0.25 parts by weight mono-2-ethylhexyl phosphoric acid ester
6) 10.3 parts by weight hydrophobic silicic acid obtained from the company Degussa-Hüls under the brand name Aerosil® R 972

7) 1.4 parts by weight of an α,ω-bis(diethoxy-3-propylamine)-terminated dodecamethylhexasiloxane
8) 0.4 parts by weight of a reaction product of dioctyltin oxide and tetrapropyl silicate (in a ratio of 45 to 55 parts by weight)
8) [sic; 9)] 0.2 parts by weight tris[3-(trimethoxysilyl)propyl] isocyanurate or for the other examples equivalent adhesive silanes having formulations C through J.

TABLE I

Properties of the RTV-1K composition according to formulation A, Example 1

Properties of formulation A, Example 1

| | |
|---|---|
| Appearance | transparent |
| Specific gravity (g/mL) | 1.026 |
| Boing [sic] flow (mm) | 2 |
| Surface crosslinking time (min) | 15–20 |
| Hardness according to DIN 53505 (° Shore A) | 18 |

Mechanical Properties of Glass Test Bodies According to DIN 52455:

| | |
|---|---|
| Tensile strength at 100% elongation (N/mm$^2$) | 0.26 |
| Tensile strength at break (N/mm$^2$) | 0.49 |
| Elongation at break (%) | 400 |
| Ejection rate at 2 bar and 4 mm diameter (g) | 220 |

| Adhesion tests according to ASTM C-794 Curing for 14 days | (N · mm$^{-1}$/% CF) |
|---|---|
| Glass | 5.3/100 |
| Eloxal ® | 5.4/100 |
| Steel | 7.2/100 |
| Copper | 8.4/100 |
| Brass | 8.2/100 |
| Polyester, glass-reinforced (GRP) | 7.0/100 |
| Acrylonitrile-butadiene-styrene (ABS) | 8.4/100 |
| Polyvinyl chloride (PVC), Kömadur | 6.1/100 |
| Polyvinyl chloride (PVC), Kömmerling | 8.0/100 |
| Polyvinyl chloride (PVC), Rehau | 8.6/100 |
| Polyvinyl chloride (PVC), Schuco | 8.1/100 |
| Polyvinyl chloride (PVC), Deceuninck | 7.7/100 |
| Polyvinyl chloride (PVC), Anglian Windows | 8.0/100 |
| Polyvinyl chloride (PVC), Anglian Windows, PMMA-coated | 8.0/100 |
| Makrolon ®, polycarbonate (PC), Bayer AG | 6.8/100 |
| Lexan ®, polycarbonate (PC), GE Plastics | 7.2/100 |
| Lexan ®, Thermoclear, polycarbonate (PC), PMMA-coated | 6.1/100 |
| Lexan ®, Exell D, polycarbonate (PC), UV-resistant | 7.0/100 |
| Lexan ®, Margard, polycarbonate (PC), silicone-hardened | 6.7/100 |
| Plexiglas ®, polymethyl methacrylate (PMMA), cast | 7.8/100 |
| Plexiglas ®, polymethyl methacrylate (PMMA), extruded | 7.9/100 |
| Plexiglas ®, XT Resist 21, PMMA, Röhm | 6.1/100 |
| Plexiglas ®, XT Resist 31, PMMA, Röhm | 7.4/100 |
| Plexiglas ®, XT Resist 41, PMMA, Röhm | 6.6/100 |
| Plexiglas ®, SDP 16, PMMA, Röhm | 8.1/100 |

*CF = cohesive failure

Comparative Example 1A–1J

For comparison purposes, silicone rubber compositions were also prepared according to formulation A but instead of 0.2 parts by weight tris[3-(trimethoxysilyl)propyl] isocyanurate, they contained 0.2 parts by weight of another adhesion promoter (Table 2). These formulations are labeled as C, D, E, F, G, H, I and J.

The comparisons produced in Examples 1A and 1B were removed from the cartridges after a storage period of 15 months at 23° C. (room temperature). A 4 mm test sheet was formed on a pane of glass by spreading the composition with a doctor blade, then this was stored for 3 days in a standard climate (room temperature 50° C. relative humidity) and allowed to crosslink under these conditions.

While the composition from Example 1A completely hardened under the influence of ambient air (standard climate), the composition from Example 1B remained plastic or tacky and uncrosslinked. Even after a storage time of 18 months at 23° C., the composition from example 1A in the form of 4 mm thick test sheet would still crosslink completely to form an elastomer molding over a period of 3 days in a standard climate.

As Example 1A shows, component f) not only improves adhesion but also prolongs the storage time for the silicone rubber composition according to this invention.

TABLE 2

Adhesion promoters used

| Formulation: | Adhesion promoter used: |
|---|---|
| A | tris[3-(trimethoxysilyl)propyl] isocyanurate (invention) |
| B | no adhesion promoter added |
| C | γ-aminopropyltriethoxysilane |
| D | N-(β-aminoethyl)-γ-aminopropyltrimethoxysilane |
| E | bis[γ-(trimethoxysilyl)]propylamine |
| F | aminosilane-modified polydimethylsiloxane |
| G | γ-metharyloxypropyltrimethoxysilane |
| H | γ-glycidyloxypropyltrimethoxysilane |
| I | γ-isocyanatopropyltriethoxysilane |
| J | γ-ureidopropyltrimethoxysilane |

ASTM (American Society for Testing and Materials) C-794 adhesion tests on Plexiglas® (polymethyl methacrylate, extruded) were performed with the formulations specified in Table 2 after curing for 14 days in a climate room (room temperature, 50% relative atmospheric humidity) and after 14 days of curing in a climate room (room temperature, 50% relative atmospheric humidity) with subsequent storage in water (room temperature 3 days). Acceptable ASTM C-794 adhesion values are defined as the quotient of force per distance being >2.6 N/mm$^{-1}$ with CF (cohesive failure) >90%, where CF denotes the percentage area content of the substrate on which sealant has remained after the tensile test. As Table 3 shows, only formulation A (use of 0.2 parts by weight tris[3-(trimethoxysilyl)propyl] isocyanurate immediately after vulcanization and without the use of primers yields adhesion to Plexiglas® (polymethyl methacrylate, extruded).

TABLE 3

Adhesion tests of the MTMS test series

| | Adhesion tests according to ASTM C-794 (N/mm$^{-1}$/% CF) | |
|---|---|---|
| Curing: | 14 days | Curing 14 days/3 days water |
| A (invention) | 7.4/100 | 7.2/100 |
| B | 0/0 | 0/0 |
| C | 0/0 | 0/0 |
| D | 0/0 | 0/0 |
| E | 0/0 | 0/0 |
| F | 0/0 | 0/0 |
| G | 0/0 | 0/0 |
| H | 0/0 | 0/0 |
| I | 0/0 | 0/0 |
| J | 0/0 | 0/0 |

Examples 2A–2J

RTV-1K silicone rubber compositions based on the formulations from Comparative Example 1 but containing instead of 2.9 parts by weight methyltrimethoxysilane (MTMS), 2.9 parts by weight vinyltrimethoxysilane (VTMO). The ASTM C-794 adhesion results on Plexiglas® (polymethyl methacrylate extruded) of these formulations are summarized in Table 4.

TABLE 4

Adhesion tests of the VTMO test series

| | Adhesion tests according to ASTM C-794 (N/mm$^{-1}$/% CF) | |
|---|---|---|
| Curing: | 14 days | Curing 14 days/3 days water |
| A (invention) | 7.0/100 | 7.2/100 |
| B | 0/0 | 0/0 |
| C | 0/0 | 0/0 |
| D | 0/0 | 0/0 |
| E | 0/0 | 0/0 |
| F | 0/0 | 0/0 |
| G | 0/0 | 0/0 |
| H | 0/0 | 0/0 |
| I | 0/0 | 0/0 |
| J | 0/0 | 0/0 |

Example 2

According to Example 1, silicon rubber compositions were prepared with different parts by weight of the tris[3-(trimethoxysilyl)propyl] isocyanurate. The isocyanurate was varied from 0.05 parts by weight to 3.50 parts by weight, the adhesion of the resulting RTV-1K blends was tested on extruded PMMA and their curing was tested. To determine the curing, a 4 mm thick sample sheet was cast on a pane of glass and after curing for 1 day in a standard climate (room temperature, 50% relative atmospheric humidity), the curing on the underside of the sheet was tested. The sample sheet was considered thoroughly cured if the underside was neither tacky nor plastic. The results are summarized in Table 5. When using 0.05 parts by weight tris[3-(trimethoxysilyl) propyl] isocyanurate in the RTV-1K composition, no adhesion to extruded PMMA was observed, whereas transparent compositions with good curing properties were obtained at concentrations above 0.05 parts by weight. Addition of tris[3-(trimethoxysilyl)propyl] isocyanurate concentrations above 1.00 parts by weight reduced the maximum possible adhesion of the cured material on Plexiglas® (polymethyl methacrylate, extruded), and above 1.60 parts by weight inadequate curing is also observed as well as a whitish discoloration of the compositions.

TABLE 5

Concentration series of tris[3-(trimethoxysilyl)propyl] isocyanurate

| Concentration: | 9) Adhesion to PMMA according to ASMT-C794 (% CF) curing for 14 days | Complete curing | Properties |
|---|---|---|---|
| 0.05 | 0 | okay | transparent |
| 0.15 | 100 | okay | transparent |
| 0.20 | 100 | okay | transparent |
| 0.30 | 100 | okay | transparent |
| 0.40 | 100 | okay | transparent |
| 0.50 | 100 | okay | transparent |
| 1.00 | 80 | okay | milky |
| 1.60 | 80 | none | milky, tacky |
| 2.00 | 10 | none | white, tacky |
| 3.50 | 0 | none | white, tacky |

Comparative Example 3

A silicone rubber composition was prepared according to Example 1 except that 0.2 parts by weight tris[3-(trimethoxysilyl)propyl] isocyanurate was omitted according to variant B. The resulting RTV-1K composition did not show any adhesion to PMMA in Table 3 or to the following substrates:
1. Polyvinyl chloride (PVC), Kömadur
2. Polyvinyl chloride (PVC), Kömmerling
3. Polyvinyl chloride (PVC), Schuco
4. Lexan®, Thermoclear, polycarbonate (PC), PMMA-coated
5. Plexiglas®, polymethyl methacrylate (PMMA), cast
6. Plexiglas®, polymethyl methacrylate (PMMA), extruded
7. Plexiglas®, XT Resist 21, PMMA, Röhm
8. Plexiglas®, XT Resist 31, PMMA, Röhm
9. Plexiglas®, XT Resist 41, PMMA, Röhm
10. Plexiglas®, SDP 16, PMMA, Röhm

Comparative Example 4

A silicone rubber composition was prepared according to Comparative Example 2A, i.e., with the modification that the basic mixture for Example 2 was prepared without 0.2 parts by weight tris[3-(trimethoxysilyl)propyl] isocyanurate according to 2B. The resulting RTV-1K composition did not show any adhesion to PMMA of Table 4 or to the following substrates:
1. Polyvinyl chloride (PVC), Kömadur
2. Polyvinyl chloride (PVC), Kömmerling
3. Polyvinyl chloride (PVC), Schuco
4. Lexan®, Thermoclear, polycarbonate (PC), PMMA-coated
5. Plexiglas®, polymethyl methacrylate (PMMA), cast
6. Plexiglas®, polymethyl methacrylate (PMMA), extruded
7. Plexiglas®, XT Resist 21, PMMA, Röhm
8. Plexiglas®, XT Resist 31, PMMA, Röhm
9. Plexiglas®, XT Resist 41, PMMA, Röhm
10. Plexiglas®, SDP 16, PMMA, Röhm

The invention claimed is:
1. Polyorganosiloxane composition obtained by mixing together the following components;
   a) at least one crosslinkable polyorganosiloxane;
   b) at least one alkoxysilane/siloxane agent;
   a) at least one phosphoric acid ester of the formula:

$O = P(OR^{17})_{3-p}(OH)_p$ where p=1 or 2 and
   $R^{17}$ is selected from the group consisting of linear or branched and optionally substituted $C_1$–$C_{30}$ alkyl groups, linear or branched C5–C$_{14}$ cycloalkyl groups, C$_6$–C$_{14}$ aryl groups, C$_6$–C$_{31}$ alkylaryl groups, linear or branched C$_2$–C$_{30}$ alkenyl groups or linear or branched C$_1$–C$_{30}$ alkoxy(C$_1$–C$_{30}$)alkyl groups, polyalkenyloxy groups (polyethers), triorganyl-silyl and diorganyl (C$_1$–C$_{30}$)alkoxysilyl groups
and/or a salt thereof;
d) at least one catalyst containing tin or at least one catalyst containing a titanium chelate;
e) at least one aminoalkylsiloxane;
f) 0.05 to 2 wt % based on the weight of the composition of at least one compound selected from the group consisting of an isocyanurate of the formula:

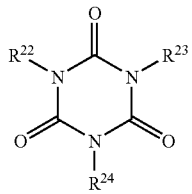

where $R^{22}$, $R^{23}$ and $R^{24}$ may be the same or different and each is selected independently of the others from the group consisting of trisalkoxysilylalkyl and alkenyl with the provision that at least one of the substituents $R^{22}$, $R^{23}$ and $R^{24}$ is a trisalkoxysilylalkyl group,
a cyanurate of the formula:

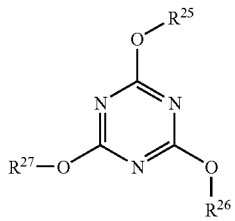

where $R^{25}$, $R^{26}$ and $R^{27}$ may be the same or different and each is selected independently of the others from the group consisting of trisaikoxysilylalkyl and alkenyl with the provision that at least one at the substituents $R^{25}$, $R^{26}$ and $R^{27}$ is a trisalkoxysilylalkyl group,
condensation products having Si—O—Si bonds of said cyanurates and isocyanurates, and mixtures thereof;
g) optionally a filler;
h) optionally an additive selected from non-crosslinkable siloxanes, adhesion promoters, fungicides, solvents, organic dyes, pigments and combinations thereof.

2. Palyorganosiloxane composition according to claim 1, wherein the amount of said component f) is 0.05 to 1.6 wt %, based on 100 wt % of the composition.

3. The polyorgariosiloxane composition of claim 2, wherein said amount of said component f) is 0.2 to 1 wt % based on 100 wt % of the composition.

4. Polyorganosiloxane composition according to claim 1, wherein the crosslinkable polyorganosiloxane has a viscosity of 0.1 to 1000 Pa·s at 25° C.

5. Polyorganosiloxane composition according to claim 1, wherein the alkoxysilane/siloxane crosslinking agent is at least one component selected from the group consisting of vinyltrialkoxysilane, methoxyethyltrialkoxysilane, methyltrialkoxysilane and tetralkoxysilane.

6. Polyorganosiloxane composition according to claim 1, obtained by combining the following components:
a) 30 to 99.3 wt % of at least one crosslinkable polyorganosiloxane;
b) 0.3 to 10 wt % of at least one alkoxysilane/siloxane crosslinking agent;
c) 0.05 to 10 wt % of at least one phosphoric acid ester of the formula:

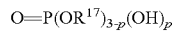

where p=1 or 2 and
R17 is selected from the group consisting of linear or branched and optionally substituted C$_1$–C$_{30}$ alkyl groups, linear or branched C$_5$–C$_{14}$ cycloalkyl groups, C$_8$–C$_{14}$ aryl groups, C$_6$–C$_{31}$ alkylaryl groups, linear or branched C$_2$–C$_{30}$, alkenyl groups or linear or branched C$_1$–C$_{30}$ alkoxy(C$_1$–C$_{30}$)alkyl groups, polyalkenyloxy groups (polyethers), triorganyl-silyl and diorganyl(C$_1$–C$_{30}$)alkoxysilyl groups
and/or a salt thereof;
d) 0.02 to 5 wt % of at least one catalyst containing tin or a titanium chelate;
e) 0.1 to 30 wt % of at least one aminoalkylsiloxane;
f) 0.05 to 20. wt %, based on 100 wt % of the composition, of at least one compound selected from the group consisting of an isocyanurate of the formula

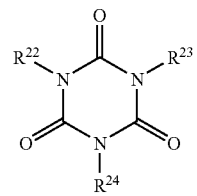

where $R^{22}$, $R^{23}$ and $R^{24}$ may be the same or different and each is selected independently of the others from the group consisting of trisalkoxysilylalkyl and alkenyl with the provision that at least one of the substituents $R^{22}$, $R^{23}$ and $R^{24}$ is a trisalkoxysilylalkyl group,
a cyanurate of the formula

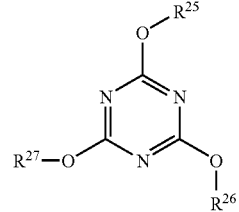

where $R^{25}$, $R^{26}$ and $R^{27}$ may be the same or different and each is selected independently of the others from the group consisting of trisalkoxysilylalkyl and alkenyl with the provision that at least one of the substituents $R^{25}$, $R^{26}$ and $R^{27}$ is a trisalkoxysilylalkyl group,
condensation products with Si—O—Si bonds of said cyanurates and isocyanurates, and mixtures thereof;
g) 0 to 60 wt % of a filler;
h) 0 to 60 wt % of an additive selected from non-crosslinkable siloxanes, adhesion promoters, fungicides, solvents, an organic dye, pigments and combinations thereof.

7. Composition obtained by vulcanizing a polyorganosiloxane composition according to claim 1.

8. Composite material containing a substrate and the composition according to claim 7.

9. Method of vulcanizing a polyorganosiloxane composition of claim 1, wherein said polyorganosiloxane composition is brought in contact with water at a temperature of 0 to 120° C.

10. A joint sealant, adhesive, coating compound or molding comprising the polyorganosiloxane of claim 1.

11. A method for sealing a polymethylmethacryate substrate, which comprises sealing said substrate with a polyorganosiloxane composition containing 0.05 to 2 wt % of at least one compound selected from the group consisting of an isocyanurate of the formula

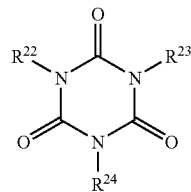

where $R^{22}$, $R^{23}$ and $R^{24}$ may be the same or different and each is selected independently of the others from the group consisting of trisalkoxysilylalkyl and alkenyl with the provision that at least one of the substituents $R^{22}$, $R^{23}$ and $R^{24}$ is a trisalkoxysilylalkyl group, a cyanurate of the formula

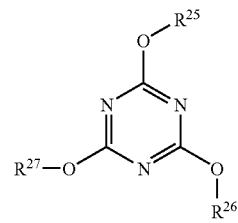

where $R^{25}$, $R^{26}$ and $R^{27}$ may be the same or different and each is selected independently of the others from the group consisting of trisalkoxysilylalkyl and alkenyl, with the provision that at least one of the substituents $R^{25}$, $R^{26}$ and $R^{27}$ is a trisalkoxysilylalkyl group, condensation products with Si—O—Si bonds of said cyanurates and isocyanurates and mixtures thereof based on the total amount of the polyorganosiloxane composition.

* * * * *